J. C. McKENZIE.
Underground Oil Reservoirs.

No. 231,924.                     Patented Sept. 7, 1880.

Witnesses.                       Inventor.
Geo. W. Nelson              Joseph C. McKenzie
Edw. C. Upstill             by J. H. Stevenson, Atty.

UNITED STATES PATENT OFFICE.

JOSEPH C. McKENZIE, OF BEAVER, PENNSYLVANIA.

UNDERGROUND OIL-RESERVOIR.

SPECIFICATION forming part of Letters Patent No. 231,924, dated September 7, 1880.

Application filed January 26, 1880.

*To all whom it may concern:*

Be it known that I, JOSEPH C. MCKENZIE, of Beaver, Beaver county, Pennsylvania, have invented a new and useful Improvement in Underground Oil-Reservoirs, which improvement is fully set forth in the following specification, reference being had to the accompanying drawings.

Similar letters of reference indicate corresponding parts.

My invention relates to a means for keeping oils at an even low temperature, whereby all danger from explosion and from evaporation, and consequent liability to be struck by lightning, is obviated. Heretofore a great need has been felt in this direction, and many incalculable losses have occurred by want of the proper containing-vessels for dangerous oils, chiefly petroleum.

In the trade it is absolutely necessary that oil should be kept in large quantities, and when thus kept it is likely to evaporate rapidly if not kept in a way which will cut off the possibility of this loss. The evaporation and giving off of gases is, of course, accelerated by a high temperature. The evaporation, causing gases to be generated and rise from the tanks, of course makes the tank a very attractive center for fires and electricity from the clouds.

I have obviated all these objections by inventing a means whereby the oil will be entirely kept from evaporation by the impregnable character of the tank, and from its situation, which, being under ground, tends always to keep the oil at the same temperature, and that a very low one, which will in itself be a great safeguard against loss or fire, which will cause loss not only of the oil, but of adjoining property which may come in the course of the river of flame which pours from a tank of burning oil when it is above ground.

I carry my invention out by making a tank such as is described herein and shown in the accompanying drawings, which is placed under ground, and contains the oil.

Figure 1:
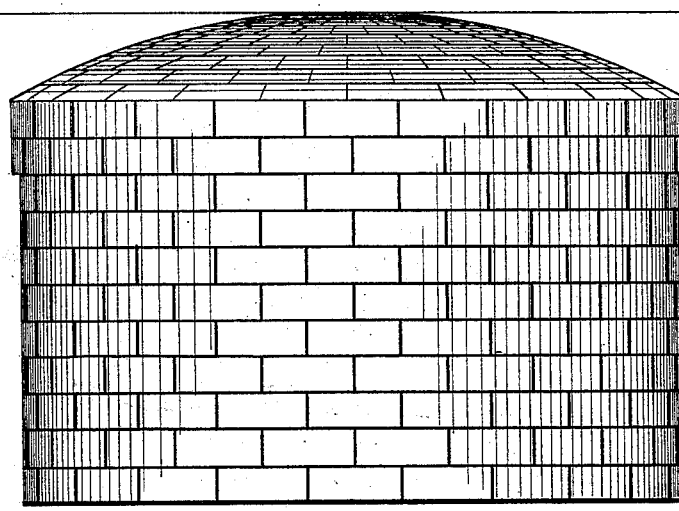
Figure 2:
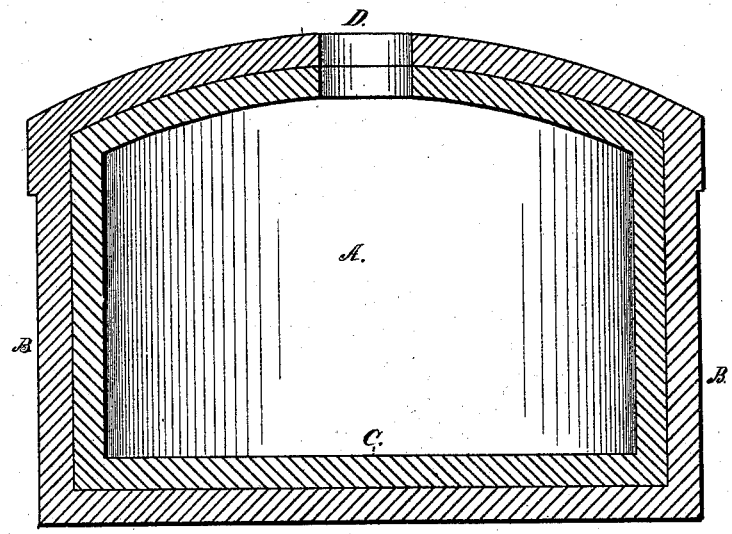

In the drawings, Figure 1 is a view of the tank from the outside. Fig. 2 is a vertical section.

A is the inside of the reservoir; B B, the outer walls; C, a cement lining, and D a receiving and drawing aperture.

In forming such reservoir a hole or excavation of proper dimensions is made in the earth and the outer wall built in it. After this it is lined with the best cement. After the cement is hardened I give the inside of the reservoir a coating of soluble glass applied like paint.

It will be noticed that the tank is almost entirely covered up, and very little room is left for a movable cover. It will be readily understood how this tank conduces to my method of keeping the oil. Its walls—hard and impregnable—will not give off one particle of gas, and will allow no evaporation whatever. The thick walls, the cement lining, and the interior glass coating all tend as well to keep the oil cool as to prevent evaporation; but in addition to this form and arrangement of tank I place it under the surface of the soil, and thereby always insure an even low temperature. As before stated, this low temperature, the prevention of evaporation and escape of gases, are the desiderata in preserving oil.

In my tank the oil may be stored for a long time without perceptible loss. It will be understood that this is a long-felt need of the trade when it is remembered how disastrous is the fluctuation in prices, and how unpleasant is the necessity of selling at any time on account of an imperfect tank.

Having thus described my invention, I desire to claim—

The herein-described method of preserving oils by placing them in a tank lined with cement and coated with soluble glass, and located underneath the surface of the ground, and keeping them always at an even low temperature, in the manner and for the purpose set forth.

JOSEPH C. McKENZIE.

Witnesses:
 KIRK T. BIGHAM,
 I. K. P. DUFF.